United States Patent
Zhou et al.

(10) Patent No.: US 11,011,927 B2
(45) Date of Patent: *May 18, 2021

(54) BALANCED FORCE BLOW-ON CONTACT AUTOMATIC TRANSFER SWITCH

(71) Applicant: Cummins Power Generation IP, Inc., Minneapolis, MN (US)

(72) Inventors: Wangwei Zhou, Shoreview, MN (US); Nicholas O. Hanson, Andover, MN (US)

(73) Assignee: Cummins Power Generation IP, Inc., Minneapolis, MN (US)

( * ) Notice: Subject to any disclaimer, the term of this patent is extended or adjusted under 35 U.S.C. 154(b) by 203 days.

This patent is subject to a terminal disclaimer.

(21) Appl. No.: 16/126,923

(22) Filed: Sep. 10, 2018

(65) Prior Publication Data

US 2019/0006881 A1 Jan. 3, 2019

Related U.S. Application Data

(63) Continuation of application No. 15/331,624, filed on Oct. 21, 2016, now Pat. No. 10,079,505.

(Continued)

(51) Int. Cl.
*H02J 9/06* (2006.01)
*H01H 77/10* (2006.01)
(Continued)

(52) U.S. Cl.
CPC .............. *H02J 9/061* (2013.01); *H01H 1/22* (2013.01); *H01H 3/222* (2013.01); *H01H 3/28* (2013.01);
(Continued)

(58) Field of Classification Search
CPC ............ H01H 23/00; H01H 9/00; H01H 9/34; H01H 9/0072; H01H 1/12; H01H 3/28;
(Continued)

(56) References Cited

U.S. PATENT DOCUMENTS 2,601,422 A * 6/1952 Thumim .............. H01H 77/101
335/16
4,021,678 A * 5/1977 Moakler .............. H01H 71/002
307/64

(Continued)

FOREIGN PATENT DOCUMENTS

| CN | 202443868.1 | 9/2012 |
| EP | 2 251 881 | 11/2010 |
| KR | 20090084111 | 8/2009 |

OTHER PUBLICATIONS

Extended European Search Report received for Application No. 16858363.1, dated Mar. 29, 2019, 8 pages.

(Continued)

*Primary Examiner* — Shawki S Ismail
*Assistant Examiner* — Lisa N Homza
(74) *Attorney, Agent, or Firm* — Foley & Lardner LLP

(57) ABSTRACT

Automatic transfer switches and methods of forming such switches are disclosed herein. One automatic transfer switch disclosed herein includes a first source bar structured to connect to a first power source, a second source bar structured to connect to a second power source, and a stationary bar structured to be coupled to a load. The automatic transfer switch also includes a first movable bar and a second movable bar each electrically coupled and rotatably connected to the stationary bar. The length of each movable bar and the angle of each movable bar with respect to the stationary bus bar are selected to approximately balance the contact force on each movable bar. Thus, smooth and reliable operations of the automatic transfer switch can be achieved.

20 Claims, 8 Drawing Sheets

Related U.S. Application Data

(60) Provisional application No. 62/245,709, filed on Oct. 23, 2015.

(51) Int. Cl.
  *H01H 3/22* (2006.01)
  *H01H 1/22* (2006.01)
  *H01H 3/28* (2006.01)
  *H01H 11/00* (2006.01)

(52) U.S. Cl.
  CPC ............ *H01H 11/00* (2013.01); *H01H 77/10* (2013.01); *H02J 9/06* (2013.01); *H01H 2235/01* (2013.01); *H01H 2300/018* (2013.01)

(58) Field of Classification Search
  CPC .... H01H 3/46; H01H 67/00; H01H 2205/002; H01H 11/00; H01J 4/00; H01J 9/061
  USPC .......................................... 335/177
  See application file for complete search history.

(56) References Cited

U.S. PATENT DOCUMENTS

| | | | | |
|---|---|---|---|---|
| 4,423,336 A * | 12/1983 | Iverson | ............... | H02J 9/06 307/64 |
| 4,849,590 A | 7/1989 | Becker et al. | | |
| 5,070,252 A * | 12/1991 | Castenschiold | ........... | H02J 9/06 307/64 |
| 5,581,133 A | 12/1996 | Smith et al. | | |
| 6,534,737 B1 * | 3/2003 | Rademacher | ............ | H01H 1/60 200/1 V |
| 6,765,157 B2 | 7/2004 | Rademacher et al. | | |
| 6,995,327 B1 * | 2/2006 | Shepstone | .............. | H01H 9/262 200/50.01 |
| 8,471,659 B1 * | 6/2013 | Flegel | ...................... | H01H 9/26 335/255 |
| 2003/0155330 A1 | 8/2003 | Rademacher et al. | | |
| 2004/0016627 A1 * | 1/2004 | Rademacher | ............ | H01H 3/40 200/1 R |
| 2010/0288610 A1 * | 11/2010 | Krieger | .................... | H01H 1/50 200/327 |
| 2011/0198203 A1 * | 8/2011 | Mueller | ................... | H01H 9/38 200/238 |
| 2013/0015044 A1 * | 1/2013 | Lee | ........................ | H02J 9/06 200/175 |
| 2014/0232490 A1 * | 8/2014 | Plude, Jr. | ............... | H01H 21/42 335/106 |
| 2014/0232491 A1 * | 8/2014 | Moroz | ..................... | H01H 3/30 335/128 |
| 2015/0371792 A1 * | 12/2015 | Feng | ........................ | H01H 9/26 200/10 |
| 2017/0117104 A1 * | 4/2017 | Zhou | ........................ | H01H 1/54 |

OTHER PUBLICATIONS

Boundless, Magnetic Force Between Two Parallel Conductors, Boundless Physics, Boundless, Aug. 8, 2016, Retrieved Jan. 30, 2017, <URL: https://www.boundless.com/physics/textbooks/boundless-physics-textbook/magnetism-21/magnetic-fields-magnetic-forces-and-conductors-159/magnetic-force-between-two-parallel-conductors-563-6223/>.

International Search Report for PCT Patent Application No. PCT/US2016/058252, dated Dec. 30, 2016, 49 pages.

\* cited by examiner

000
BALANCED FORCE BLOW-ON CONTACT AUTOMATIC TRANSFER SWITCH

CROSS-REFERENCE TO RELATED APPLICATIONS

This application claims priority to and the benefit of U.S. patent application Ser. No. 15/331,624, filed Oct. 21, 2016, entitled "Balanced Force Blow-On Contact Automatic Transfer Switch", which application claims priority to and the benefit of U.S. Provisional Patent Application No. 62/245,709, filed Oct. 23, 2015, both of which are incorporated herein by reference in their entireties.

FIELD

This present disclosure relates to automatic transfer switches (ATS).

BACKGROUND

An automatic transfer switch is used to switch an electric load back and forth between a primary power source, such as a utility, and a secondary power source, such as a generator. Transferring power from the primary to the secondary source happens, for example, when the utility experiences a blackout. When the power outage is over, the automatic transfer switch switches the power source back to utility power.

SUMMARY

One embodiment relates to an automatic transfer switch comprising a first source bar, a second source bar, and a stationary bar. The first source bar is structured to connect to a first power source. The second source bar is structured to connect to a second power source. The stationary bar is structured to be coupled to a load. The automatic transfer switch further comprises a first movable bar electrically coupled and rotatably connected to the stationary bar and a second movable bar electrically coupled and rotatably connected to the stationary bar. The first movable bar contacts the first source bar to provide power from the first power source to the load. The first movable bar is subjected to a first force biasing a first contact of the first movable bar towards the first source bar and a second force biasing the first contact of the first movable bar away from the first source bar. The first force comprises a first mechanical force and a first electromagnetic force induced by current flowing through the stationary bar and the first movable bar. The second force comprises a second electromagnetic force induced by current flowing between the first source bar and the first contact of the first movable bar. The second movable bar contacts the second source bar to provide power from the second power source to the load. The second movable bar is subjected to a third force biasing a second contact of the second movable bar towards the second source bar and a fourth force biasing the second contact of the second movable bar away from the second source bar. The third force comprises a third mechanical force and a third electromagnetic force induced by current flowing through the stationary bar and the second movable bar. The fourth force comprises a fourth electromagnetic force induced by current flowing between the second source bar and the second contact of the second movable bar. A length of the first movable bar and an angle of the first movable bar with respect to the stationary bar are selected to approximately balance the first force and the second force for a predetermined current level.

Another embodiment relates to an automatic transfer switch cassette comprising a first source bar structured to connect to a first power source, a second source bar structured to connect to a second power source, and a stationary bar structured to be coupled to a load. The automatic transfer switch cassette further comprises a first movable bar rotatably connected to the stationary bar and structured to rotate between a first closed position and a first open position. At the first closed position, the first movable bar engages the first source bar and connects the load to the first power source. At the first open position the first movable bar disengages the first source bar and disconnects the load from the first power source. The first movable bar is subjected to a first force biasing the first movable bar towards the first source bar and a second force biasing the first movable bar away from the first source bar at the first closed position. The first force and the second force are approximately balanced for a predetermined current level. The automatic transfer switch cassette further comprises a second movable bar rotatably connected to the stationary bar and structured to rotate between a second closed position and a second open position. At the second closed position, the second movable bar engages the second source bar and connects the load to the second power source. At the second open position the second movable bar disengages the second source bar and disconnects the load from the second power source. The second movable bar is subjected to a third force biasing the second movable bar towards the second source bar and a fourth force biasing the second movable bar away from the second source bar at the second closed position. The third force and the fourth force are approximately balanced for the predetermined current level.

Yet another embodiment relates to a method of making an automatic transfer switch. The method comprises providing, on a cassette, a first source bar structured to connect to a second power source; providing, on the cassette, a second source bar structured to connect to a second power source; providing, on the cassette, a stationary bar structured to be coupled to a load; selecting a length of a first movable bar and an angle of the first movable bar with respect to the stationary bar; and rotatably connecting the first movable bar of the selected length to the stationary bar. The first movable bar is structured to rotate between a first closed position and a first open position. At the first closed position, the first movable bar forms the selected angle with respect to the stationary bar and engages the first source bar to connect the load to the first power source. At the first open position the first movable bar disengages the first source bar to disconnect the load from the first power source. The first movable bar is subjected to a first force biasing the first movable bar towards the first source bar and a second force biasing the first movable bar away from the first source bar at the first closed position. The length and the angle are so selected that the first force and the second force are approximately balanced for a predetermined current level. The method further comprises rotatably connecting a second movable bar to the stationary bar. The second movable bar is structured to rotate between a second closed position and a second open position. At the second closed position, the second movable bar engages the second source bar to connect the load to the second power source. At the second open position the second movable bar disengages the second source bar to disconnect the load from the second power source.

These and other features, together with the organization and manner of operation thereof, will become apparent from the following detailed description when taken in conjunction with the accompanying drawings.

DETAILED DESCRIPTION

Figure 1:
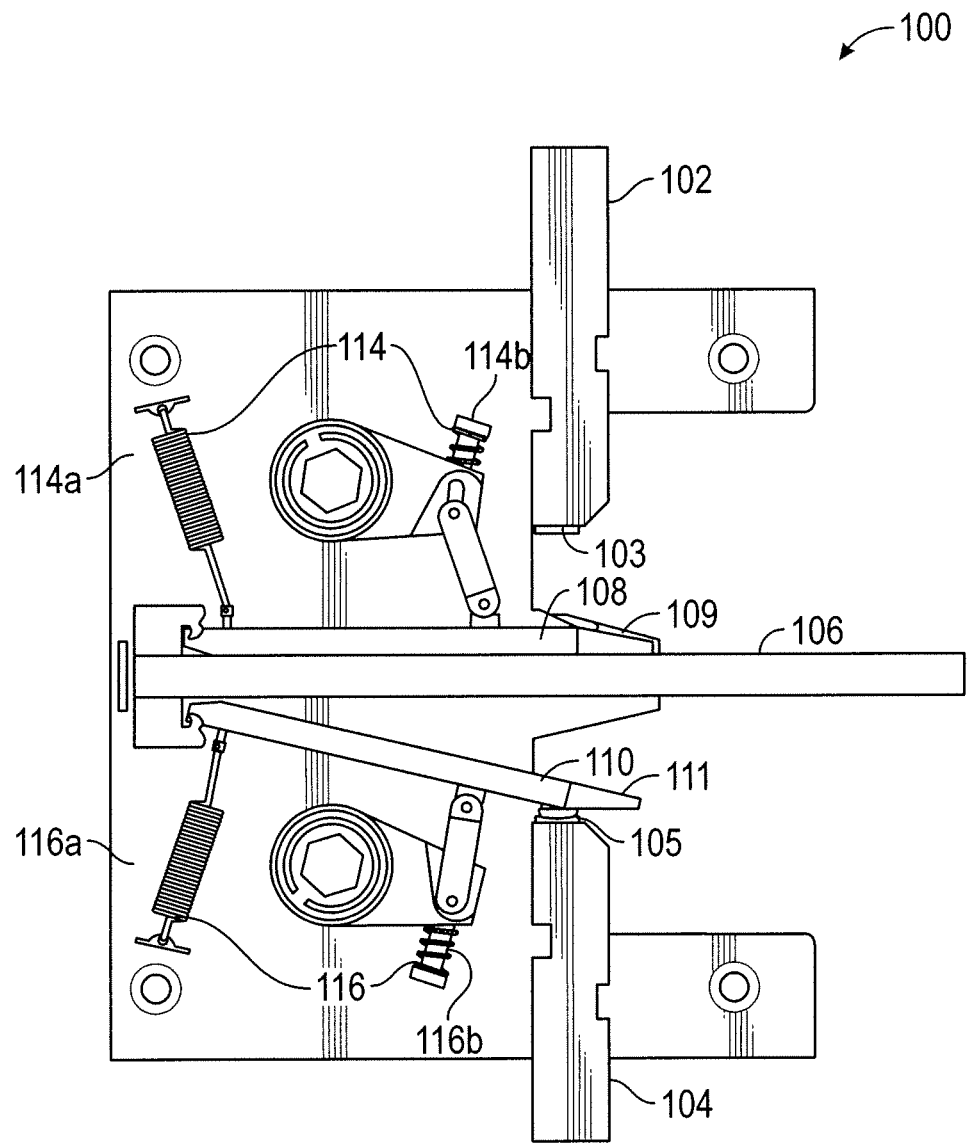
FIG. 1 is a schematic diagram of a blow-on contact automatic transfer switch cassette.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and made part of this disclosure.

A blow-on contact automatic transfer switch utilizes a "blow-on" electromagnetic force induced by an electrical current flowing through the switch to keep together contacts that connect an electrical load to the power sources. As used herein, a blow-on force refers to the force that biases the switch contacts towards one another (e.g., biases a contact of a movable member towards a contact of a fixed member, such as a source bar/terminal). With increased current flow levels, the blow-on force might be very strong so as to prevent smooth and reliable operation of the switch and/or cause damage to the contacts. In some cases, the induced electromagnetic force can be large enough to physically bend or contact weld the contacts. A design to ensure reliable operation of the switch and avoid contacts damages in the large overcurrent situation is desired.

Referring to the figures generally, various embodiments disclosed herein relate to an automatic transfer switch with balanced blow-on and blow-off forces. An automatic transfer switch switches an electric load between two or more power sources via contacts that connect the electrical load to the power sources. Depending on the load type (e.g., a resistive load, or a motor load), a current flow level on the switch contacts can reach one to six times the nominal current level when a fault condition (e.g., overcurrent) occurs. When short circuit happens to the load or the terminal, the current flow level can rise to twenty times the nominal current level or higher, depending on the power source transformer output impedance. For example, a 2,000 A transfer switch may carry 40 KA current when short circuit happens. With power sources or power source transformers of lower output impedance, the output current can reach 100 KA or higher.

The blow-on force on contacts of the switch induced by the current through the switch increases with the amount of current. Very strong blow-on force might make the contacts hard to disconnect, thereby preventing smooth and reliable operation of the switch. Further, temperature of the contacts will rise due to excess heat generated by the contact resistance. When the temperature is at or near the melting point of the contacts, which may be made of silver alloy, the contacts can weld together during short circuit. A proper contact force between the contacts is used to maintain the contacts together, but should not be so strong as to affect operations of the switch or damage the contacts when over current situation occurs. In embodiments disclosed herein, parameters of the blow-on contact automatic transfer switch are selected such that the balance of the blow-on force and the blow-off force is kept at a desirable range for a predetermined current level (e.g., for the maximum anticipated overcurrent) to allow for proper operation of the contacts by the mechanical linkage and aid in preventing contact welding.

Referring to FIG. 1, a schematic diagram of a blow-on contact automatic transfer switch cassette 100 is shown. Cassette 100 includes a first source bar 102 with a first source contact pad 103, a second source bar 104 with a second source contact pad 105, a stationary bar 106, a first movable bar 108 with a first movable contact pad 109, a second movable bar 110 with a second movable contact pad 111, a first spring and mechanical linkage 114, and a second spring and mechanical linkage 116. In some embodiments, the first source bar 102 and the second source bar 104 are fixed on the cassette 100. The first source bar 102 may be connected to a primary power source (not illustrated in the present figure), for example, a utility. The second source bar 104 may be coupled to a secondary power source (not illustrated in the present figure), for example, a generator. In some embodiments, the stationary bar 106 is also fixed on the cassette 100. The stationary bar 106 may be coupled to an electrical load (not illustrated in the present figure), for example, a resistive load and/or a motor load. The load may include appliances, lights, or other loads desirable to power in the event of a utility grid failure. In some embodiments, stationary bar 106 is a T-shaped bar. It is noted that in various embodiments, the second source bar 104, the second movable bar 110, the second source contact pad 105, the second movable contact pad 111, and the second spring and mechanical linkage 116 may be omitted. In other embodiments, the stationary bar 106 may be lengthened and the second source bar 104, the second movable bar 110, the second source contact pad 105, the second movable contact pad 111, and second spring and mechanical linkage 116 may be placed further along the length of the stationary bar 106 on the same side and of the same orientation as the first source bar 102, the first movable bar 108, the first source contact pad 103, the first movable contact pad 109, and the first spring and mechanical linkage 114.

The first movable bar 108 and the second movable bar 110 are each electrically coupled and rotatably connected to the stationary bar 106. The first and second movable bars 108 and 110 each rotate between a closed position and an open position. As used herein, the "closed position" refers to the situation in which the movable bar engages the corresponding source bar of the power source that supplies power. The "open position" refers to the situation in which the movable bar disengages the corresponding source bar of the power source that is disconnected from the load. When power is being supplied from the primary power source, the first movable contact pad 109 at an end of the first movable bar 108 engages the first source contact pad 103 at an end of the first source contact 102. The first movable bar 108 is in the closed position and the electrical load is electrically connected to the primary power source. When there is an interruption in the primary power source, the first movable bar 108 rotates from the closed position to the open position to disengage the first movable contact pad 109 from the first source contact pad 103. The second movable bar 110 rotates from the open position to the closed position to allow the second movable contact pad 111 at an end of the second movable bar 110 to engage the second source contact pad 105 at an end of the second source contact 104. The electrical load is electrically connected to the secondary power source. A similar operation is performed to transfer back to the primary power source from the secondary power source when the interruption is over. In some embodiments, the contacts pads 103, 105, 109, and 111 are made of silver alloy or copper alloy.

Figure 2:
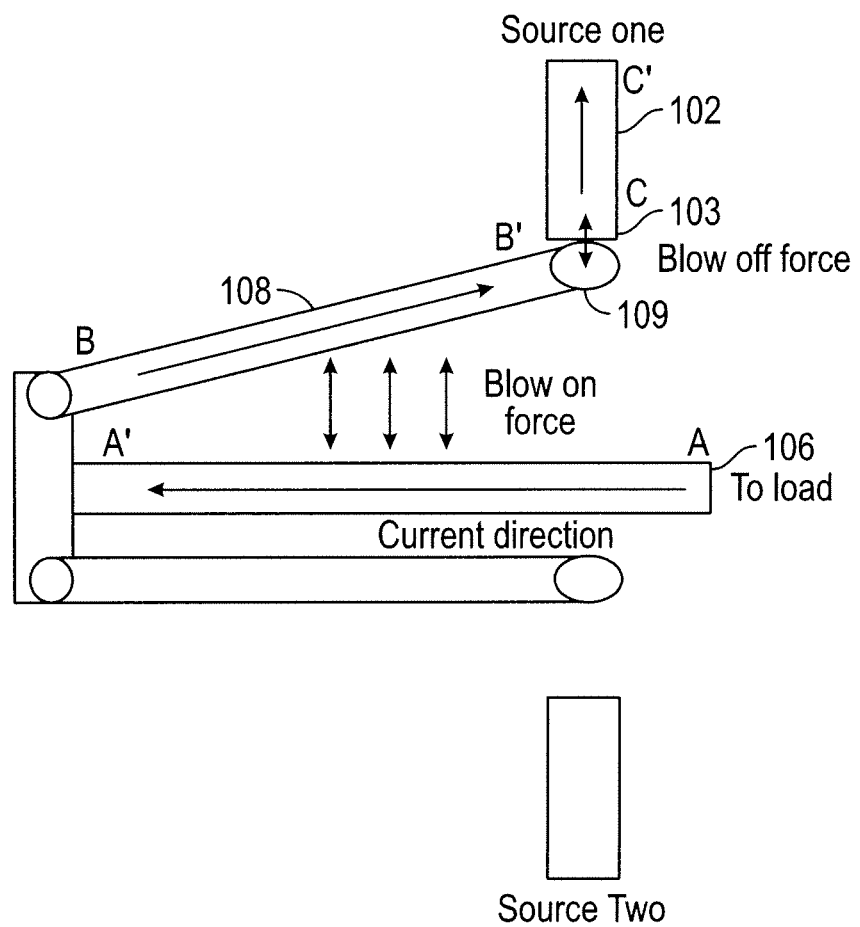
FIG. 2 is a schematic diagram of blow-on and blow-off forces on a movable bar of the automatic transfer switch of FIG. 1 at a closed position.
Figure 3:
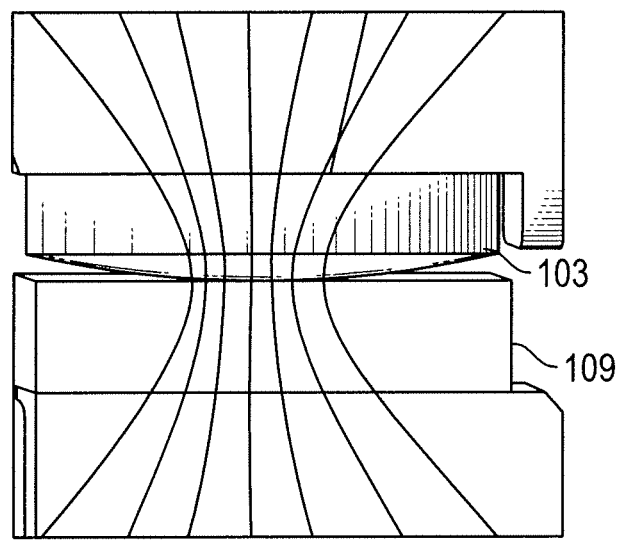
FIG. 3 is a schematic diagram illustrating current flowing through contacts of the automatic transfer switch of FIG. 1.

Referring to FIG. 2, schematic diagram of blow-on and blow-off forces on a movable bar of the automatic transfer switch of FIG. 1 is shown in a closed position. The current flow path is A-A' in the stationary bar 106, B-B' in the first movable bar 108, and C-C' in the first source contact 102. Since the current flow directions are opposite in the stationary bar 106 and the first movable bar 108, an electromagnetic force is induced that biases the first movable bar 108 away from the stationary bar 106. This is the blow-on force that biases the first movable contact pad 109 towards the first source contact pad 103. FIG. 3 illustrates current flowing through the first movable contact pad 109 and the first source contact pad 103. As shown, the in and out currents between the first movable contact pad 109 and the first source contact pad 103 are not on the same axis but form an angle. As a result, the in current and the out current induce a repulsive electromagnetic force between the first movable contact pad 109 and the first source contact pad 103 which biases the first movable contact pad 109 away from the first source contact pad 103. This is a blow-off force that separates the contacts apart.

Referring back to FIG. 1, the cassette 100 may further include springs to help maintain a contact force during operation. As shown in the figure, the first spring and mechanical linkage 114 includes a spring 114a as part of the mechanical linkage that pulls from the bottom of the first movable bar 108 and a spring 114b that presses on top of the first movable bar 108. The second spring and mechanical linkage 116 includes a spring 116a as part of the mechanical linkage that pulls from the bottom of the second movable bar 110 and a spring 116b that presses on top of the second movable bar 110. In some embodiments, springs 114a and 114b may be combined into one spring, as may springs 116a and 116b. In some embodiments, the first spring and mechanical linkage 114 and the second spring and mechanical linkage 116 each apply about 10 N to 100 N contact force on the corresponding movable bar at the closed position.

Figure 4:
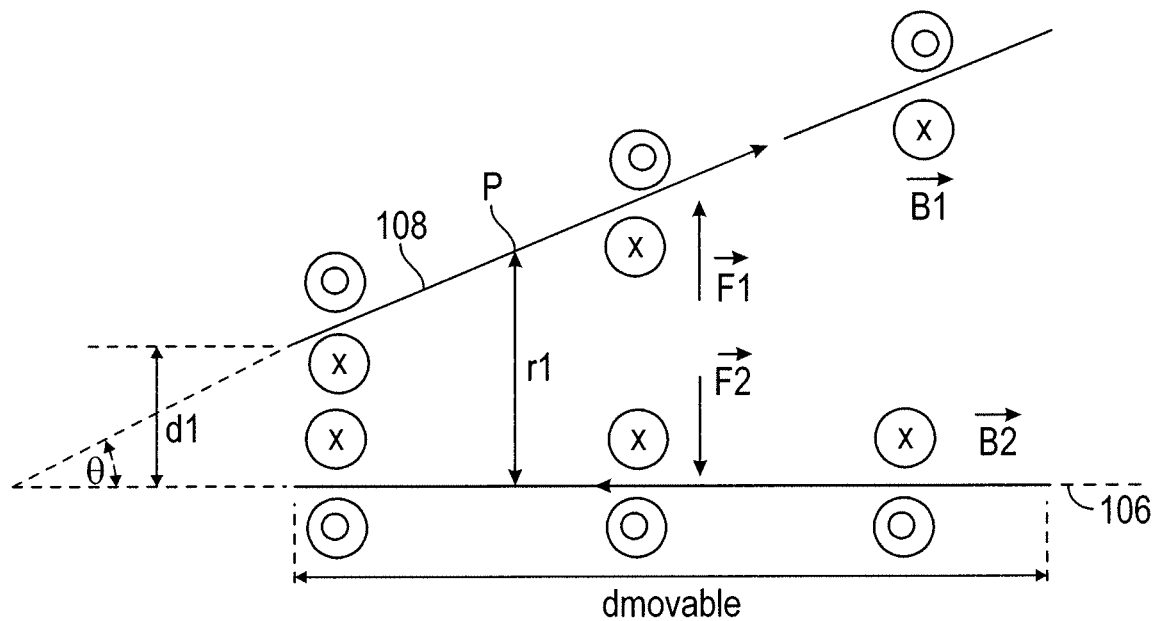
FIG. 4 is an example schematic diagram illustrating parameters of the automatic transfer switch of FIG. 1.

Referring to FIG. 4, a schematic diagram illustrating parameters of the automatic transfer switch of FIG. 1 is shown according to an exemplary embodiment. The balance of the contact force between the first movable contact pad 109 and the first source contact pad 103 in the closed position is calculated as follows:

$$F_{contact} = F_{spring} + F_{blowon} - F_{blowoff} \quad (1)$$

$F_{contact}$ is the balance of the force between the first movable contact pad 109 and the first source pad 103, $F_{spring}$ is the force applied by the first spring and mechanical linkage 114 biasing the contacts together, $F_{blowon}$ is the blow-on electromagnetic force between the stationary bar 106 and the first movable bar 108 biasing the contacts together, and $F_{blowoff}$ is the blow-off electromagnetic force between the first movable contact pad 109 and the first source pad 103 biasing the contacts away from one another. In some embodiments, the contact force applied by the first spring and mechanical linkage 114 is 10 N to 100 N in the closed position. The blow-on force and blow-off force are calculated as follows, in some implementations:

$$F_{blowon} = \frac{1}{2} \cdot \cos\theta \cdot \int_0^{d_{movable}} \frac{I_s^2 \cdot \mu_0}{2\pi(\tan\theta \cdot x + d_1)} dx \quad (2)$$

$$F_{blowoff} = 4.45 \times 10^{-7} I_s^2 A^{-2} N \quad (3)$$

In the above, θ is an angle between the stationary bar 106 and the first movable bar 108 in the closed position, $d_{movable}$ is a length of a projection of the first movable bar 108 on the stationary bar 106, $d_1$ is the distance between the stationary bar 106 and the first movable bar 108 in the open position, $I_s$ is a level of a current flowing through the switch, and $\mu_0$ is the magnetic constant. Information relating to equation (3) is discussed in Electrical Contacts: Principles and Applications, Second Edition, edited by Paul G. Slad. As shown in equations (2) and (3), the blow-on force ($F_{blowon}$) is related to the parameters (i.e., θ and $d_{movable}$) of the switch in addition to the current level ($I_s$), while the blow-off force ($F_{blowoff}$) is decided by the current level ($I_s$).

Equation (2) may be derived as follows. For any point P on the first movable bar 108, the magnetic flux density at point P is:

$$B(r_1) = \frac{\mu_0 I_s(t)}{2\pi r_1} \quad (4)$$

In the above, $r_1$ is the perpendicular distance of point P to the stationary bar 106, t is time (the current level $I_s$ changes periodically over time for a sinusoid AC current). The blow-on force on a unit length at point P is:

$$F(r_1) = I_s(t) \cdot B(r_1) \quad (5)$$

Figure 5:
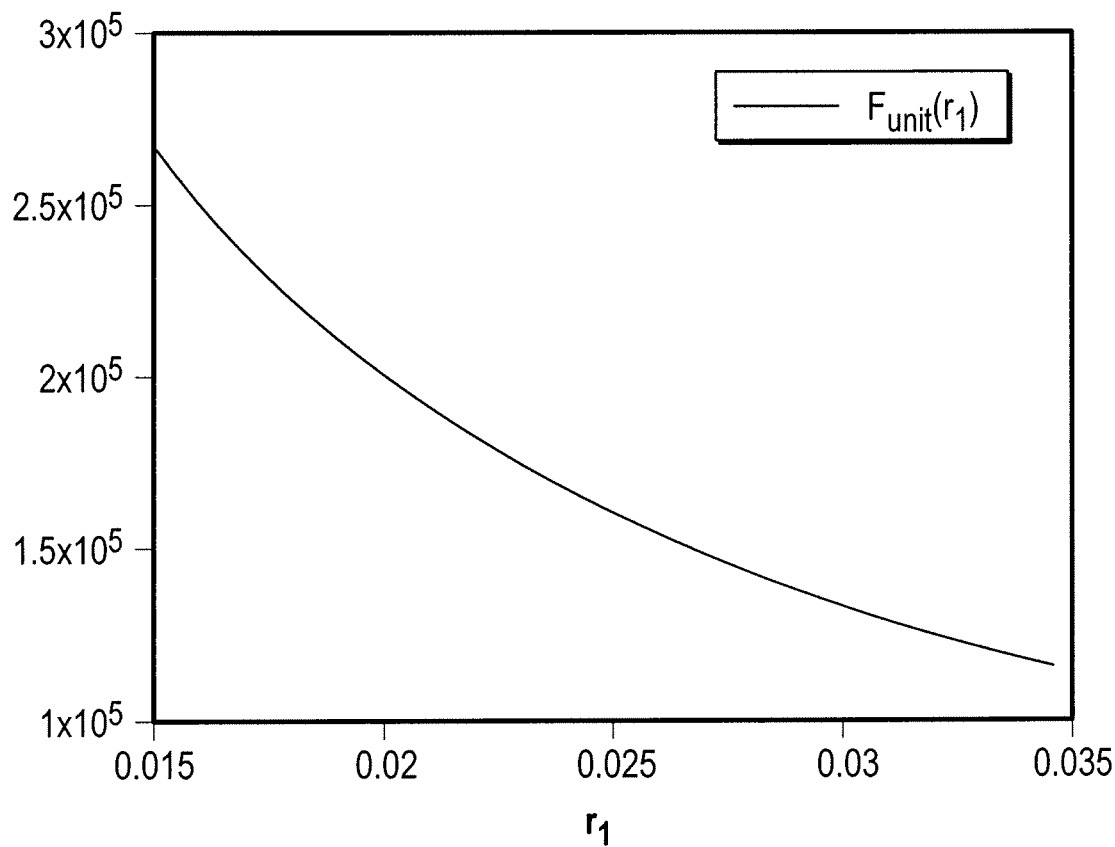
FIG. 5 is an example graph illustrating the relationship between the blow-on force on a unit length at a point of a movable bar of the automatic transfer switch of FIG. 1 and the perpendicular distance of the point to a stationary bar.

Equation (2) is derived by integrating the blow-on force on a unit length along the first movable bar 108. Referring to FIG. 5, a graph illustrating the relationship between the blow-on force and $r_1$ is shown at a point of time when the current level is 100 KA.

Figure 6A:
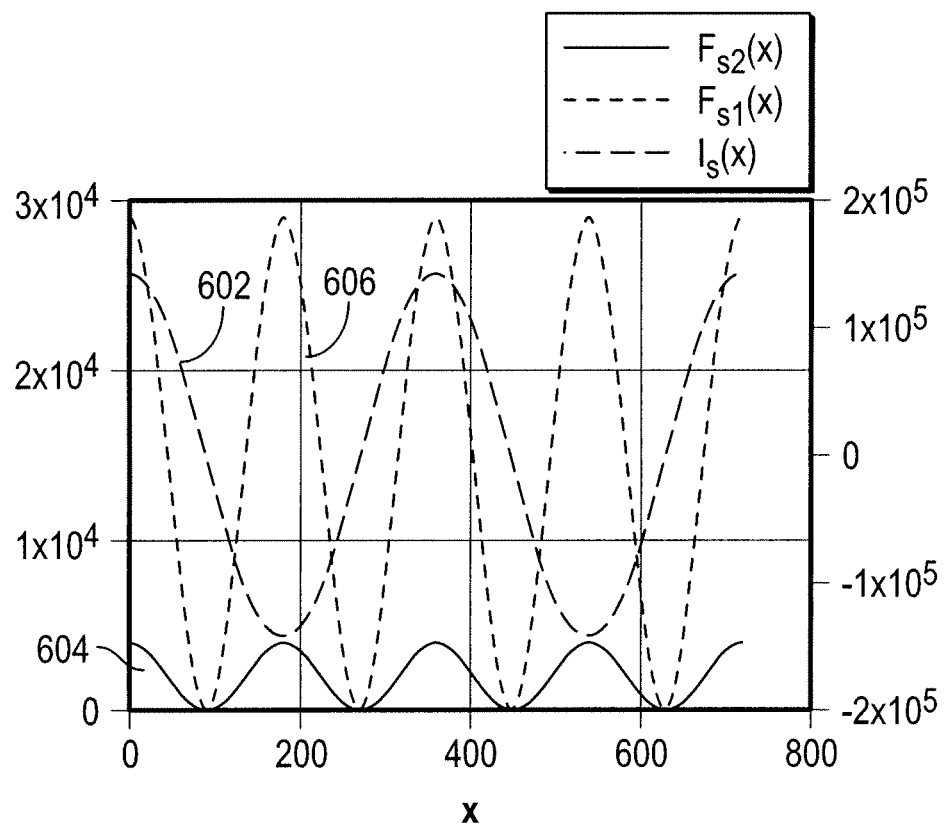
FIG. 6A is an example graph illustrating the level of current flowing through the automatic transfer switch of FIG. 1 changing over time, as well as the blow-on force on a unit length at a near end and a far end of the movable bar changing over time.
Figure 6B:
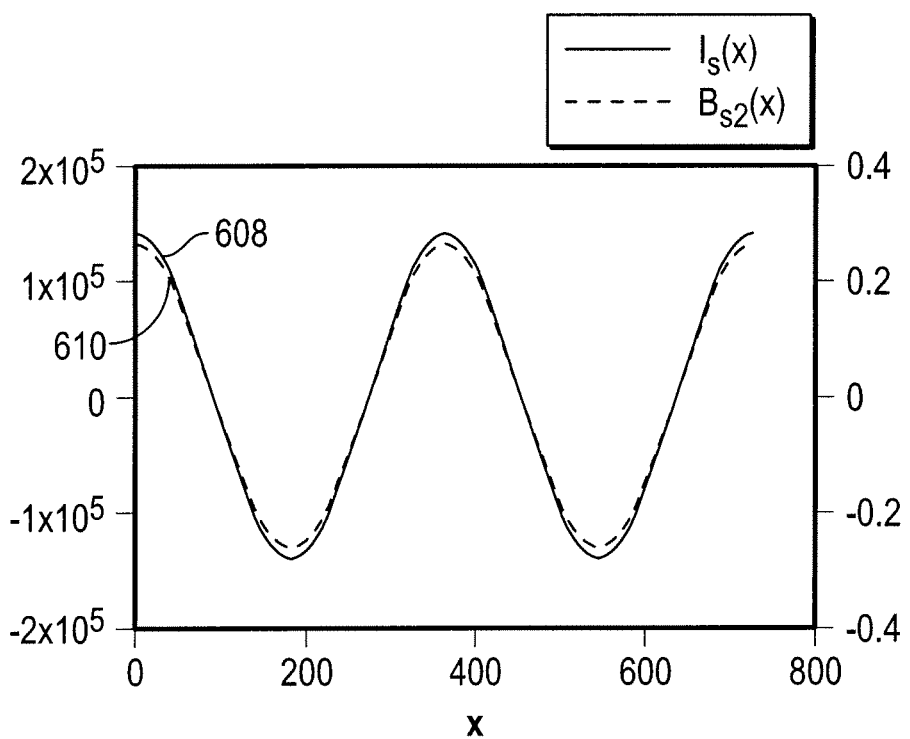
FIG. 6B is an example graph illustrating the level of current flowing through the automatic transfer switch of FIG. 1 changing over time, as well as the magnetic flux density at the far end of the movable bar changing over time.

In FIG. 6A, curve 602 shows the current level Is that changes periodically over time for a sinusoid AC current. Curve 604 shows the blow-on force on a unit length at a far end (the end of the first movable bar 108 that is far from the stationary bar 106) that changes over time accordingly. Curve 606 shows the blow-on force on a unit length at a near end (the end of the first movable bar 108 that is near to the stationary bar 106) that changes over time accordingly. In FIG. 6B, curve 608 shows the current level that changes periodically over time for a sinusoid AC current. Curve 610 shows the magnetic flux density at the near end of the movable bar that changes over time accordingly.

Figure 7:
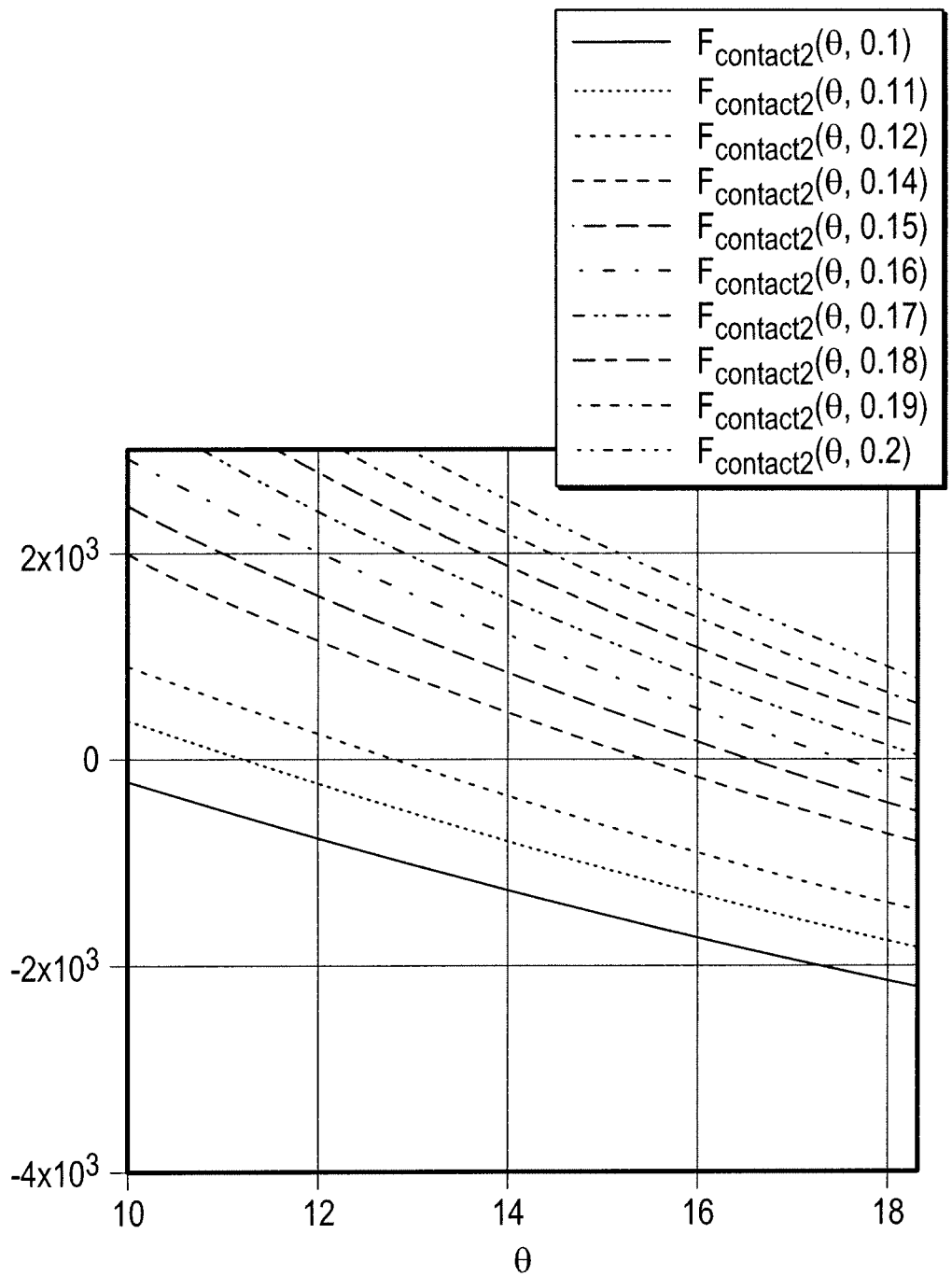
FIG. 7 is an example graph illustrating the relationship between a contact force and parameters of the automatic transfer switch of FIG. 1.

Referring to FIG. 7, a graph illustrating the relationship between a contact force and parameters (i.e., θ and $d_{movable}$) of the automatic transfer switch of FIG. 1 is shown according to an exemplary embodiment. In equations (1)-(3), the force applied by the spring in the closed position ($F_{spring}$) is set as 26.7 N, the distance between the stationary bar and the movable bar in the open position ($d_1$) is set as 15.05 mm, and the current level ($I_s$) is set as an overcurrent of 100 KA. The blow-off force ($F_{blowoff}$) calculated by equation (3) is 8.9× $10^3$ N. As shown in FIG. 7, the contact force on the contacts decreases as the angle (θ) between the stationary bar and the movable bar in the closed position increases, and increases as the length of the movable bar increases. During design of the automatic transfer switch, the parameters (θ and $d_{movable}$) can be selected by referring to the graph under some criteria, for example, to approximately balance the force biasing the contacts together and the force biasing the contacts away from each other. As used herein, "approximately balance" means that the balance of the force biasing the contacts together and the force biasing the contacts away from each other is above zero but below a predetermined level, for example, 1000 N. In some embodiments, the balance is below 500 N. In some embodiments, the balance is below 200 N. In some embodiments, the balance is below 100 N. In some embodiments, the balance is below 50 N. In some embodiments, the balance under a nominal current level is above zero to keep the contacts together and not beyond a desired level under the maximum rated current or possible surge current. An example of the selection is as follows: $d_1$ is 15.05 mm, θ is 15°, $d_{movable}$ is 150 mm, $F_{spring}$ is 26.7 N. For a 100 KA fault current level, the blow off force would be 8.9×$10^3$ N, the blow on force would be 9.375×$10^3$ N, and the balance of the contact force would be about 500 N. Thus, smooth and reliable operation of the automatic transfer switch may be provided and risk of damage to the contact pads may be reduced. In some embodiments, the desired level of contact force is less than about 1000 N to prevent stress to the mechanism of the contacts and to the contact alloy. In some embodiments, the desired level of contact force is slightly above zero to prevent contact separation and arcing.

As discussed above, the angle (θ) between the first movable bar and the stationary bar and the length ($d_{movable}$) of a projection of the first movable bar on the stationary bar for achieving the desired level of contact force depends on the distance between the stationary bar and the movable bar in the open position ($d_1$). In design, it is generally desirable to select as small angle and short length on the movable bar as possible to allow for low forces and ease of operation. In some embodiments, the distance between the stationary bar and the movable bar in the open position ($d_1$) is in a range of about 15 mm to about 35 mm. Accordingly, the angle θ may be in a range of 8 degree to 20 degree, and the length $d_{movable}$ may be in a range of 8 mm to 18 mm.

Figure 8A:
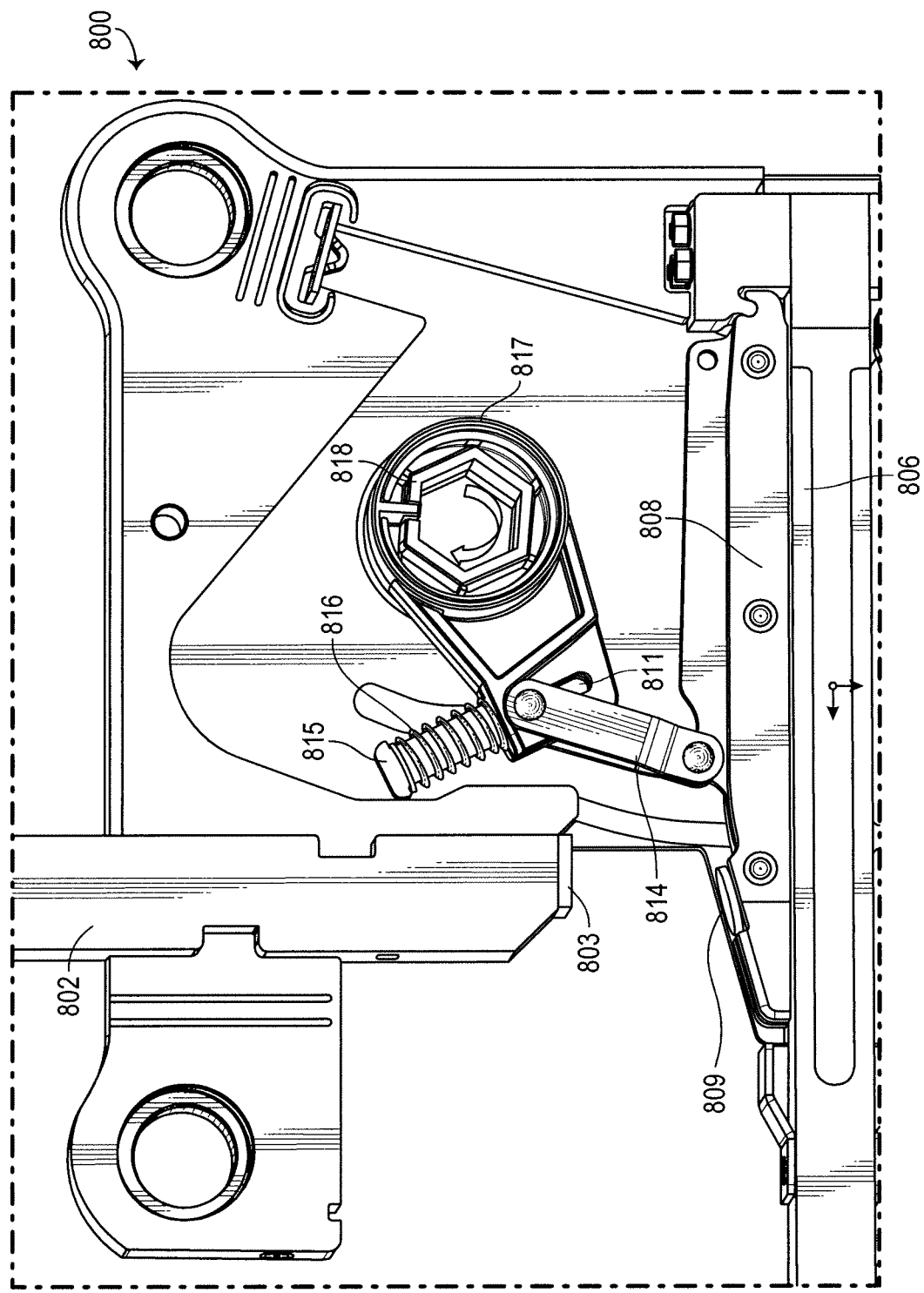
FIG. 8A is a schematic diagram of an anti-bounce blow-on contact automatic transfer switch cassette at an open position.
Figure 8B:
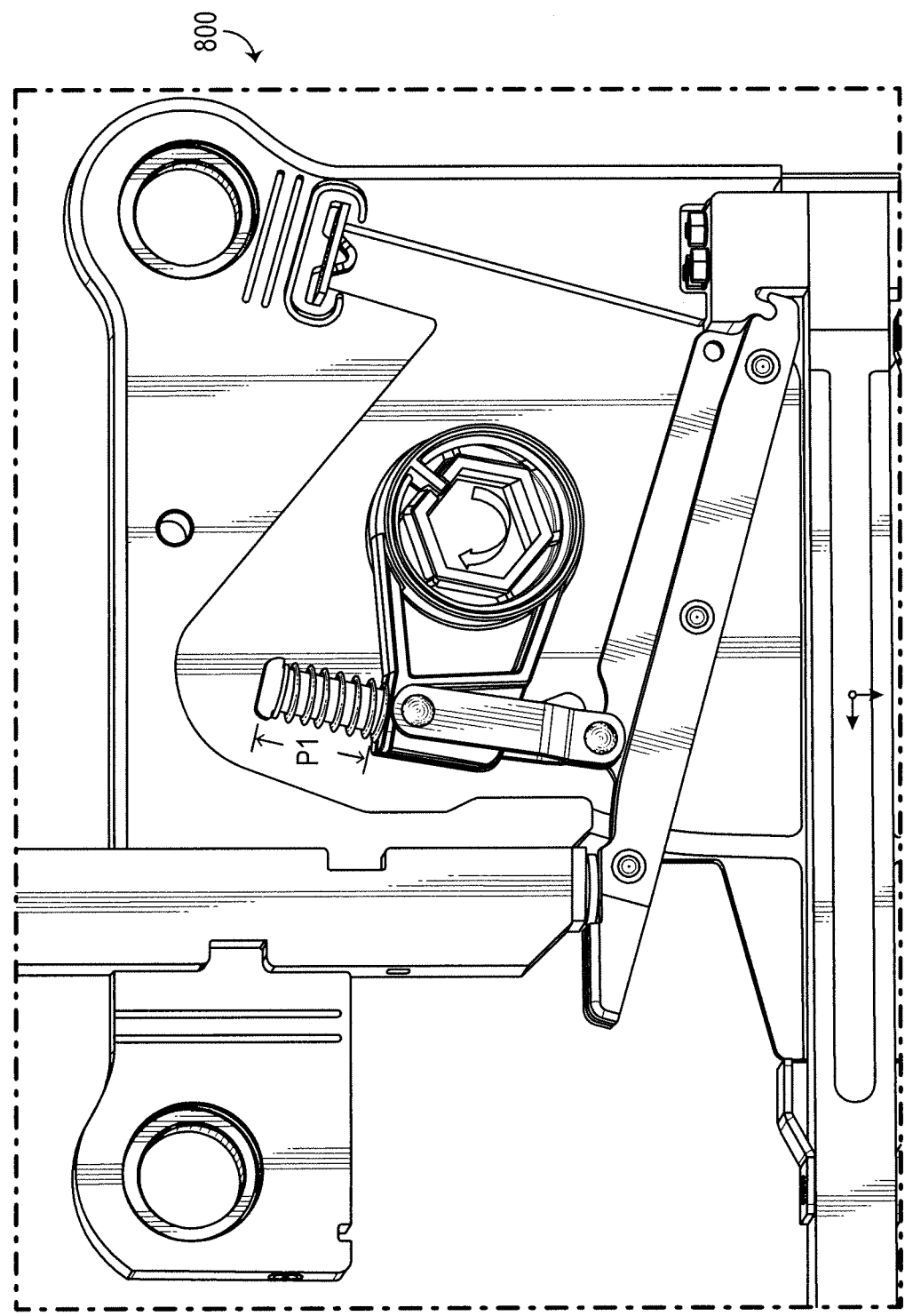
FIG. 8B is a schematic diagram of the anti-bounce blow-on contact automatic transfer switch cassette of FIG. 8A at an initial closed position.
Figure 8C:
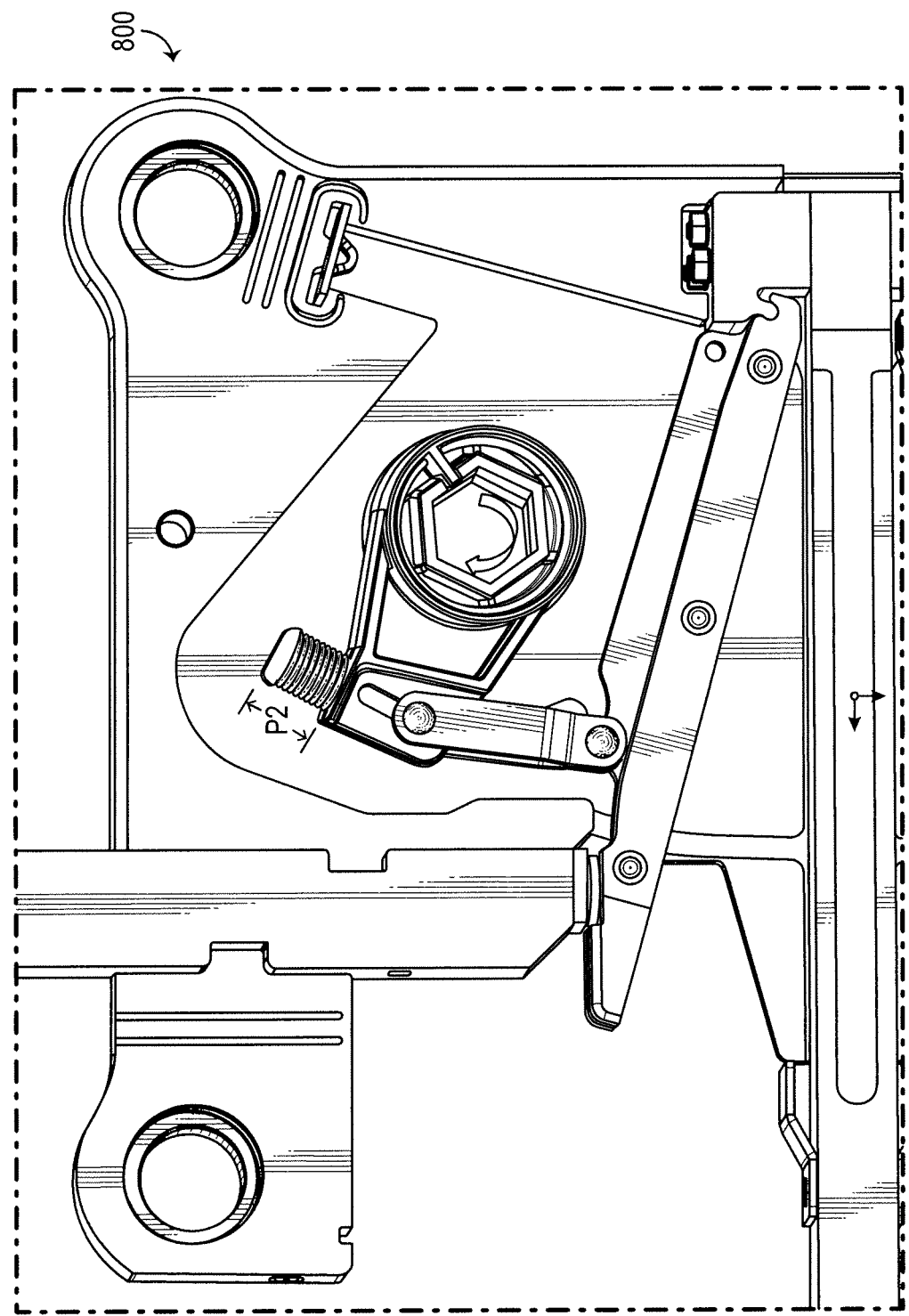
FIG. 8C is a schematic diagram of the anti-bounce blow-on contact automatic transfer switch cassette of FIGS. 8A and 8B at an ultimate closed position.

The design disclosed herein can be implemented on various types of blow-on contact ATS, for example, on an anti-bounce blow-on contact ATS. Upon closing, contact pads on an ATS might bounce due to the blow-on force and the material elasticity of the contact pads. Although lasting only a few milliseconds, a bounce might cause arcing that can damage the contact pads. An anti-bounce blow-on contact ATS can reduce the bounce back of the contact pads by gradually pressing the contact pads against each other upon closing. In particular, FIG. 8A shows an anti-bounce blow-on contact ATS cassette 800 at an open position. FIG. 8B shows the anti-bounce blow-on contact ATS cassette 800 at an initial closed position. FIG. 8C shows the anti-bounce blow-on contact automatic transfer switch cassette 800 at an ultimate closed position. The cassette 800 includes a source bar 802 with a source contact pad 803, a stationary bar 806, a movable bar 808 with a movable contact pad 809, a movable linkage 814, a T-shaped linkage 815, a spring 816, a cam 817 with a hex bar 818. The source bar 802, the stationary bar 806, and the movable bar 808 may have similar structures as the corresponding components discussed with reference to FIG. 1 The cam 817 is rotatably mounted on the cassette 800. The movable bar 808 is linked to the cam 817 through the movable linkage 814, which is coupled to the cam 817 through a slot 811. The spring 816 is wound around the T-shaped linkage 815 and coupled to the cam 817. The cam 817 can rotate along the T-shaped linkage 815 when the spring 816 is compressed. The hex bar 818 is formed within the cam 817.

Upon closing, the hex bar 818 is driven to rotate, which drives the cam 817 to rotate. The rotation of the cam 817 pulls the movable bar 808 up to the initial closed position where the movable contact pad 809 is just in contact with the source contact pad 803. At the initial position, the spring 816 is substantially not compressed and has a length of P1. When the contact pads 809 and 803 are closed at the initial position, the movement of the movable bar 808 and of the movable linkage 814 is impeded by the source bar 802. As the hex bar 818 is continually driven to rotate, the cam 817 rotates along the T-shaped linkage 815 and gradually compresses the spring 816 until an ultimate closed position is reached. At the ultimate closed position, the spring 816 is compressed and has a length of P2 shorter than P1. During the progress from the initial closed position to the ultimate closed position, the contact force between the contact pads 809 and 803 gradually increases. The initial lower contact force followed by a gradual increase of contact force helps minimize bounce back of the contact pads 809 and 803 upon closing.

While this specification contains specific implementation details, these should not be construed as limitations on the scope of any inventions or of what may be claimed, but rather as descriptions of features specific to particular implementations. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations may be depicted in a particular order, this should not be understood as requiring that such operations be performed in the particular order shown or in sequential order, or that all operations be performed, to achieve desirable results. Moreover, the separation of various aspects of the implementations described above should not be understood as requiring such separation in all implementations, and it should be understood that the described methods can generally be integrated in a single application or integrated across multiple applications.

The construction and arrangements of the ATS systems as shown in the various exemplary embodiments, are illustrative only. Although only certain embodiments have been described in detail in this disclosure, many modifications are possible (e.g., variations in sizes, dimensions, structures, shapes and proportions of the various elements, values of parameters, mounting arrangements, use of materials, colors, orientations, image processing and segmentation algorithms, etc.) without materially departing from the novel teachings and advantages of the subject matter described herein. Some elements shown as integrally formed may be constructed of multiple parts or elements, the position of elements may be reversed or otherwise varied, and the nature or number of discrete elements or positions may be altered or varied. The order or sequence of any process, logical algorithm, or method steps may be varied or re-sequenced according to alternative embodiments. Other substitutions, modifications, changes and omissions may also be made in the design, operating conditions and arrangement of the various exemplary embodiments without departing from the scope of the present invention.

As may be utilized herein, the terms "approximately," "about," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," etc.) are merely used to describe the orientation of various elements in the drawings. It should be noted that the orientation of various elements may differ according to other exemplary embodiments, and that such variations are intended to be encompassed by the present disclosure.

With respect to the use of substantially any plural and/or singular terms herein, those having skill in the art can translate from the plural to the singular and/or from the singular to the plural as is appropriate to the context and/or application. The various singular/plural permutations may be expressly set forth herein for the sake of clarity.

What is claimed is:

1. An automatic transfer switch, comprising:
    a first source bar structured to connect to a first power source;
    a second source bar structured to connect to a second power source;
    a stationary bar structured to be coupled to a load; and
    a first movable bar electrically coupled and rotatably connected to the stationary bar, wherein the first movable bar contacts the first source bar to provide power from the first power source to the load, wherein the first movable bar is subjected to a first force biasing a first contact of the first movable bar towards the first source bar and a second force biasing the first contact of the first movable bar away from the first source bar, wherein the first force comprises a first mechanical force and a first electromagnetic force induced by current flowing through the stationary bar and the first movable bar, and wherein the second force comprises a second electromagnetic force induced by current flowing between the first source bar and the first contact of the first movable bar;
    wherein a length of the first movable bar and an angle of the first movable bar with respect to the stationary bar are selected to approximately balance the first force and the second force for a predetermined current level.

2. The automatic transfer switch of claim 1, wherein approximately balancing the first force and the second force comprises causing a balance of the first force and the second force to be within a predetermined threshold.

3. The automatic transfer switch of claim 2, wherein the balance of the first force and the second force is within 1000 N corresponding to a 100 KA or greater current flowing through the automatic transfer switch.

4. The automatic transfer switch of claim 2, wherein the balance of the first force and the second force is slightly above zero corresponding to a 100 KA or greater current flowing through the automatic transfer switch.

5. The automatic transfer switch of claim 1, further comprising:
    a first spring and mechanical linkage mechanically coupled to the first movable bar and applying the first mechanical force.

6. The automatic transfer switch of claim 1, wherein when the first movable bar is in contact with the first source bar, the angle between the first movable bar and the stationary bar is in a range of 8 degree to 20 degree, and the length of a projection of the first movable bar on the stationary bar is in a range of 8 mm to 18 mm.

7. The automatic transfer switch of claim 1, further comprising a second movable bar disposed at a same side of the stationary bar as the first movable bar, the second movable bar electrically coupled and rotatably connected to the stationary bar, wherein the second movable bar contacts the second source bar to provide power from the second power source to the load, wherein the second movable bar is subjected to a third force biasing a second contact of the second movable bar towards the second source bar and a fourth force biasing the second contact of the second movable bar away from the second source bar, wherein the third force comprises a third mechanical force and a third electromagnetic force induced by current flowing through the stationary bar and the second movable bar, and wherein the fourth force comprises a fourth electromagnetic force induced by current flowing between the second source bar and the second contact of the second movable bar.

8. The automatic transfer switch of claim 1, wherein the automatic transfer switch comprises a spring structured to increase compression between the first movable bar and the first source bar in a closed position to prevent contact bounce.

9. The automatic transfer switch of claim 8, further comprising a movable linkage, a T-shaped linkage, and a cam with a hex bar, wherein the first movable bar is linked to the cam through the movable linkage, wherein the spring is wound around the T-shaped linkage and coupled to the cam, wherein the hex bar is structured to rotate the cam from an initial closed position to an ultimate closed position, wherein at the initial closed position the first movable bar contacts the first source bar the spring is substantially not compressed, and wherein at the ultimate closed position the first movable bar is pressed against the first source bar and the spring is compressed.

10. An automatic transfer switch cassette, comprising:
   a first source bar structured to connect to a first power source;
   a second source bar structured to connect to a second power source;
   a stationary bar structured to be coupled to a load; and
   a first movable bar rotatably connected to the stationary bar and structured to rotate between a first closed position and a first open position, wherein at the first closed position, the first movable bar engages the first source bar to connect the load to the first power source, wherein at the first open position the first movable bar disengages the first source bar to disconnect the load from the first power source, wherein the first movable bar is subjected to a first force biasing the first movable bar towards the first source bar and a second force biasing the first movable bar away from the first source bar at the first closed position, and wherein the first force and the second force are approximately balanced for a predetermined current level.

11. The automatic transfer switch cassette of claim 10, wherein the first force comprises a first mechanical force and a first electromagnetic force induced by current flowing through the stationary bar and the first movable bar, wherein the second force comprises a second electromagnetic force induced by current flowing between the first source bar and a first contact of the first movable bar.

12. The automatic transfer switch cassette of claim 11, further comprising:
   a first spring and mechanical linkage mechanically coupled to the first movable bar and applying the first mechanical force.

13. The automatic transfer switch cassette of claim 10, wherein a length of the first movable bar and an angle of the first movable bar with respect to the stationary bar at the first closed position are selected to approximately balance the first force and the second force.

14. The automatic transfer switch cassette of claim 13, wherein the angle between the first movable bar and the stationary bar at the first closed position is in a range of 8 degree to 20 degree, and the length of a projection of the first movable bar on the stationary bar is in a range of 8 mm to 18 mm.

15. The automatic transfer switch cassette of claim 10, wherein the first force and the second force are approximately balanced so that a balance of the first force and the second force is within a predetermined threshold.

16. The automatic transfer switch of claim 15, wherein the balance of the first force and the second force is within 1000 N corresponding to a 100 KA or greater current flowing through the automatic transfer switch.

17. The automatic transfer switch of claim 15, wherein the balance of the first force and the second force is slightly above zero corresponding to a 100 KA or greater current flowing through the automatic transfer switch.

18. The automatic transfer switch cassette of claim 10, further comprising a movable linkage, a T-shaped linkage, a spring, and a cam with a hex bar, wherein the first movable bar is linked to the cam through the movable linkage, wherein the spring is wound around the T-shaped linkage and coupled to the cam, wherein the hex bar is structured to rotate the cam from an initial closed position to an ultimate closed position, wherein at the initial closed position the first movable bar contacts the first source bar the spring is substantially not compressed, and wherein at the ultimate closed position the first movable bar is pressed against the first source bar and the spring is compressed.

19. The automatic transfer switch cassette of claim 10, further comprising a second movable bar disposed at a same side of the stationary bar as the first movable bar, the second movable bar rotatably connected to the stationary bar and structured to rotate between a second closed position and a second open position, wherein at the second closed position, the second movable bar engages the second source bar to connect the load to the second power source, wherein at the second open position the second movable bar disengages the second source bar to disconnect the load from the second power source, wherein the second movable bar is subjected to a third force biasing the second movable bar towards the second source bar and a fourth force biasing the second movable bar away from the second source bar at the second closed position, and wherein the third force and the fourth force are approximately balanced for the predetermined current level.

20. The automatic transfer switch cassette of claim 19, wherein the first force comprises a first mechanical force and a first electromagnetic force induced by current flowing through the stationary bar and the first movable bar, wherein the second force comprises a second electromagnetic force induced by current flowing between the first source bar and a first contact of the first movable bar, wherein the third force comprises a third mechanical force and a third electromagnetic force induced by current flowing through the stationary bar and the second movable bar, and wherein the fourth force comprises a fourth electromagnetic force induced by current flowing between the second source bar and a second contact of the second movable bar.

* * * * *